United States Patent
Okamoto

(10) Patent No.: US 11,881,644 B2
(45) Date of Patent: Jan. 23, 2024

(54) WIRE REINFORCING MATERIAL AT THE PONT OF CRIMPING A TERMINAL ONTO THE WIRE

(71) Applicant: SUMITOMO WIRING SYSTEMS, LTD., Mie (JP)

(72) Inventor: Yuji Okamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/774,446

(22) PCT Filed: Oct. 29, 2020

(86) PCT No.: PCT/JP2020/040694
§ 371 (c)(1),
(2) Date: May 4, 2022

(87) PCT Pub. No.: WO2021/095552
PCT Pub. Date: May 20, 2021

(65) Prior Publication Data
US 2022/0407249 A1    Dec. 22, 2022

(30) Foreign Application Priority Data
Nov. 11, 2019    (JP) .................... 2019-203751

(51) Int. Cl.
*H01B 7/24* (2006.01)
*H01R 11/11* (2006.01)
*B60R 16/02* (2006.01)
*H01R 4/18* (2006.01)

(52) U.S. Cl.
CPC .......... *H01R 11/11* (2013.01); *B60R 16/0207* (2013.01); *H01B 7/24* (2013.01); *H01R 4/18* (2013.01)

(58) Field of Classification Search
CPC ... H01B 7/24; H01R 4/18; H01R 4/20; H01R 4/186–11/11
See application file for complete search history.

(56) References Cited

U.S. PATENT DOCUMENTS 7,883,365 B2 *    2/2011    Saitou ............... H01R 13/5205
                                                      439/587
2010/0200272 A1    8/2010    Yoshinaga et al.
2018/0366842 A1   12/2018    Yamashita et al.

FOREIGN PATENT DOCUMENTS

| JP | S56-031472 U | 3/1981 |
| JP | 2014-060073 A | 4/2014 |
| JP | 2014-220167 A | 11/2014 |

OTHER PUBLICATIONS

International Search Report dated Dec. 22, 2020 for WO 2021/095552 A1 (4 pages).

* cited by examiner

*Primary Examiner* — Vanessa Girardi
(74) *Attorney, Agent, or Firm* — Venjuris, P.C.

(57) ABSTRACT

The present disclosure provides a wire with terminal that can suppress buckling of a wire during assembly. A wire with terminal includes a wire having a core wire made of a conductor and an insulation coating covering the outer periphery of the core wire, and a terminal connected to a lengthwise end portion of the wire. Also, the wire with terminal includes a reinforcing material adhered to an outer peripheral surface of the insulation coating and an unreinforced part where the reinforcing material is not provided, in the circumferential direction of the wire.

6 Claims, 2 Drawing Sheets

WIRE REINFORCING MATERIAL AT THE PONT OF CRIMPING A TERMINAL ONTO THE WIRE

CROSS REFERENCE TO RELATED APPLICATIONS

This application is a national phase of PCT application No. PCT/JP2020/040694, filed on 29 Oct. 2020, which claims priority from Japanese patent application No. 2019-203751, filed on 11 Nov. 2019, all of which are incorporated herein by reference.

TECHNICAL FIELD

The present disclosure relates to a wire with terminal and a connector.

BACKGROUND

Patent Document 1, for example, describes a wire with terminal attached to the housing of a connector. With this wire with terminal, a terminal fixed to an end portion of a wire is inserted into a terminal mounting hole of the housing.

PRIOR ART DOCUMENT

Patent Document

Patent Document 1: JP 2010-182616 A

SUMMARY OF THE INVENTION

Problems to be Solved

With a wire with terminal such as described above, the increasingly smaller diameter of wires means that the wire is more likely to buckle during insertion into the terminal mounting hole, which adversely affects the assemblability of the wire with terminal, thus leaving room for improvement in this respect.

In view of this, an object is to provide a wire with terminal and a connector that are able to suppress buckling of a wire during assembly.

Means to Solve the Problem

A wire with terminal of the present disclosure is a wire with terminal including a wire having a core wire made of a conductor and an insulation coating covering an outer periphery of the core wire, and a terminal connected to a lengthwise end portion of the wire, the wire with terminal including a reinforcing material adhered to an outer peripheral surface of the insulation coating and an unreinforced part where the reinforcing material is not provided, in a circumferential direction of the wire.

Effect of the Invention

According to the present disclosure, buckling of a wire during assembly can be suppressed.

DETAILED DESCRIPTION TO EXECUTE THE INVENTION

Description of Embodiments of Disclosure

Figure 1:
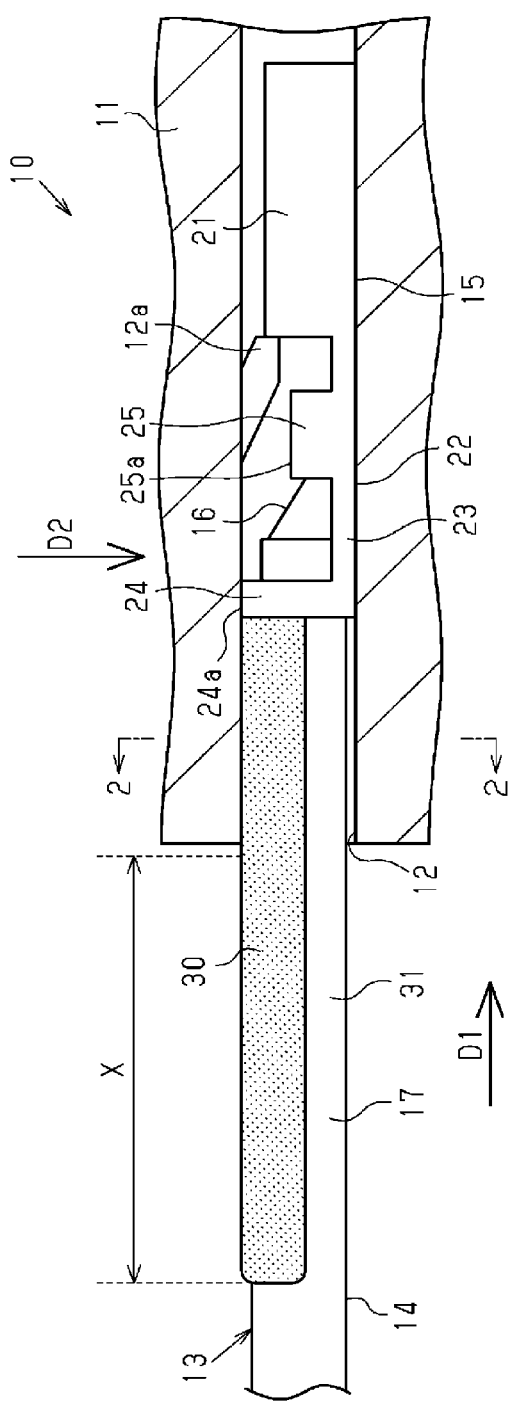
FIG. 1 is a cross-sectional view showing part of a connector according to an embodiment.

Initially, modes for carrying out the present disclosure will be enumerated and described.

[1] A wire with terminal of the present disclosure is a wire with terminal including a wire having a core wire made of a conductor and an insulation coating covering an outer periphery of the core wire, and a terminal connected to a lengthwise end portion of the wire, the wire with terminal including a reinforcing material adhered to an outer peripheral surface of the insulation coating and an unreinforced part where the reinforcing material is not provided, in a circumferential direction of the wire.

According to this configuration, buckling of the wire can be suppressed by the reinforcing material. Also, the reinforcing material is partially provided in the circumferential direction of the wire, thus enabling the amount of material that is used for the reinforcing material to be suppressed, compared to the case where the reinforcing material is provided around the entire circumference of the wire, and also enabling the increase in weight of the wire due to providing the reinforcing material and the increase in diameter of the wire where the reinforcing material is provided to be suppressed.

[2] Preferably the terminal has a fixing part in which a lengthwise end portion of the wire is fixed by crimping, and the reinforcing material is formed by being applied to the outer peripheral surface of the insulation coating from a direction along the crimping direction of the fixing part.

According to this configuration, it is possible to implement the process of fixing the wire in the fixing part by crimping and the process of applying the reinforcing material to the outer peripheral surface of the insulation coating, without changing the installed state of the wire with terminal. As a result, deterioration in the production efficiency of the wire with terminal due to providing the reinforcing material can be suppressed.

[3] A connector of the present disclosure includes the wire with terminal according to the above [1] or [2], and a housing having a terminal mounting hole in which the end portion of the wire with terminal including the terminal is inserted.

According to this configuration, buckling of the wire when inserting the terminal into the housing can be suppressed by the reinforcing material.

[4] Preferably the reinforcing material comes in contact with an inner surface of the terminal mounting hole.

According to this configuration, buckling of the wire inside the terminal mounting hole can be suppressed.

DETAILED DESCRIPTION OF EMBODIMENTS OF DISCLOSURE

Specific examples of a wire with terminal and a connector of the present disclosure will be described below with reference to the drawings. Note that the present invention is not limited to these illustrative examples and is defined by the claims, and all changes that come within the meaning and range of equivalency of the claims are intended to be embraced therein. In the drawings, the configuration may be partially exaggerated or simplified for convenience of description. Also, the size ratios of the various portions may be different from actual size.

A connector 10 shown in FIG. 1 is, for example, a connector that is used in a vehicle wire harness for achieving electrical connection of in-vehicle devices. The connector 10 includes a housing 11 and a wire with terminal 13 assembled by being inserted into a terminal mounting hole 12 of the housing 11.

The wire with terminal 13 includes a wire 14 and a terminal 15 fixed to a lengthwise end portion of the wire 14.

Figure 2:
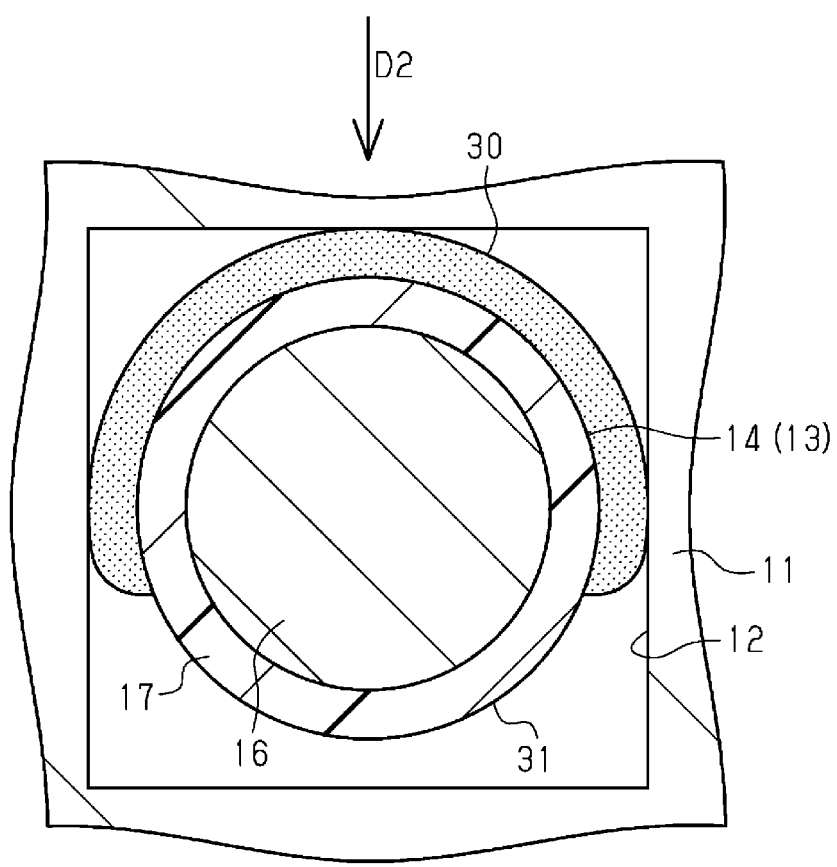
FIG. 2 is cross-sectional view taken along line 2-2 in FIG. 1.

As shown in FIGS. 1 and 2, the wire 14 has a core wire 16 and an insulation coating 17 covering the outer periphery of the core wire 16. At the lengthwise end portion of the wire 14, the insulation coating 17 has been stripped and the core wire 16 is exposed. For example, a stranded wire in which a plurality of metal wires are twisted together can be used for the core wire 16. Also, as for the metal material forming the core wire 16, an aluminum-based or copper-based metal material, for example, can be used. Also, the core wire 16 and the insulation coating 17 are formed by extrusion molding, for example.

As shown in FIG. 1, the terminal 15 is inserted into the terminal mounting hole 12 in an insertion direction D1 along the lengthwise direction of the wire 14. Hereinafter, the front end in the insertion direction D1 and the rear end in the insertion direction D1 may be simply described as the front end and the rear end, respectively.

The terminal 15 is, for example, formed from a metal plate material by a pressing process. On the front end side of the terminal 15 is formed a counterpart connection part 21 to be connected to a counterpart terminal not shown. Also, a fixing part 22 in which the lengthwise end portion of the wire 14 is fixed is formed on the rear end side relative to the counterpart connection part 21 of the terminal 15.

The fixing unit 22 has a pair of first crimping pieces 24 extending from a base part 23 of the terminal 15 and a pair of second crimping pieces 25 likewise extending from the base part 23. Note that FIG. 1 shows a state in which only the first crimping piece 24 on the near side and the second crimping piece 25 on the near side of the pair of first crimping pieces 24 and the pair of second crimping pieces 25 are visible.

The first crimping pieces 24 are formed at the rear end portion of the terminal 15. The second crimping pieces 25 are formed at a position between the first crimping pieces 24 and the counterpart connection part 21. The first crimping pieces 24 fix the insulation coating 17 of the wire 14 by crimping. Also, the second crimping pieces 25 fix the core wire 16 exposed from the insulation coating 17 by crimping, and electrical conduction between the terminal 15 and the core wire 16 is thereby established.

Note that, in the first crimping pieces 24, the end portion on the side that connects to the base part 23 is a fixing end, and the tip extending from the base part 23 is a free end 24a. Similarly, in the second crimping pieces 25, the end portion on the side that connects to the base part 23 is a fixing end, and the tip extending from the base part 23 is a free end 25a.

When fixing the wire 14 in the fixing part 22, first, the free ends 24a of the first crimping pieces 24 and the free ends 25a of the second crimping pieces 25 are placed in an opened state, and the lengthwise end portion of the wire 14 is disposed on the base part 23 of the fixing part 22. Thereafter, the first crimping pieces 24 are crimped from a crimping direction D2 by being deformed so as to enclose the insulation coating 17. Also, the second crimping pieces 25 are crimped from the crimping direction D2 by being deformed so as to enclose the exposed region of the core wire 16.

The entirety of the terminal 15 and the region of the wire 14 in the vicinity of the terminal 15 are inserted in the terminal mounting hole 12. An elastically deflectable latching piece 12a for preventing the inserted terminal 15 from coming out is formed inside the terminal mounting hole 12. In the process of inserting the terminal 15 into the terminal mounting hole 12, the latching piece 12a interferes with the front end of the terminal 15 and is elastically deflected. Upon the terminal 15 reaching the mounting position, the latching piece 12a elastically returns and latches on the terminal 15, and the terminal 15 is fixed by this latching operation.

The area of the wire 14 close to the rear end portion of the terminal 15 functions as a holding area X that is held when assembling the wire with terminal 13 in the terminal mounting hole 12. When the terminal 15 is inserted into the terminal mounting hole 12, the operator himself or herself or an automatic assembly device holds the holding area X of the wire 14 without directly touching the terminal 15, and applies an insertion force in the insertion direction D1 to the wire with terminal 13. At this time, rearward insertion resistance caused by the elastic restoring force of the latching piece 12a acts on the terminal 15, and there is a risk that the region of the wire 14 from the holding area X to the rear end portion of the terminal 15 will buckle and deform.

As a countermeasure against buckling of the wire 14 described above, a reinforcing material 30 is provided in an area of the wire 14 from a region including the holding area X to the rear end portion of the terminal 15. The front end of the reinforcing material 30 is in a positional relationship of coming in contact with or being slightly spaced away from the rear end of the terminal 15.

The reinforcing material 30 is formed with a synthetic resin applied to the outer peripheral surface of the insulation coating 17. A material having flexibility when applied to the insulation coating 17 and having the characteristic of curing after application is used for the material forming the reinforcing material 30. Polyvinyl chloride (PVC) and a photocurable resin that cures due to irradiation of ultraviolet light, visible light or the like are given as examples of the material forming the reinforcing material 30.

As shown in FIG. 2, the reinforcing material 30 is partially provided in the circumferential direction of the wire 14, and is not provided around the entire circumference of the wire 14. That is, in the area where the reinforcing material 30 is provided in the lengthwise direction of the wire 14, the reinforcing material 30 and an unreinforced part 31 where the reinforcing material 30 is not provided are set in the circumferential direction of the wire 14. The unreinforced part 31 is a region where the reinforcing material 30 is not applied, and the outer peripheral surface of the insulation coating 17 is exposed in the non-reinforcing part 31.

Also, the reinforcing material 30 is formed by being applied to the outer peripheral surface of the insulation coating 17 from a direction along the crimping direction D2 of the fixing part 22. That is, assuming the free end 24a and 25a sides of the crimping pieces 24 and 25 of the fixing part 22 are on the upper side of the wire with terminal 13, the reinforcing material 30 is provided over an area on the upper side of the insulation coating 17. Also, in this embodiment, the application area of the reinforcing material 30 occupies approximately half of the wire 14 in the circumferential direction.

As shown in FIG. 1, in a state where the wire with terminal 13 is disposed in a normal attachment position, part of the reinforcing material 30 in the lengthwise direction of the wire 14 is located on the inner side of the terminal mounting hole 12.

As shown in FIG. 2, the reinforcing material 30 comes in contact with three of the inner surfaces of the terminal mounting hole 12 having a rectangular cross-section. Specifically, as described above, assuming the free end 24a and 25a sides of the crimping pieces 24 and 25 of the fixing part 22 are on the upper side of the wire with terminal 13, the reinforcing material 30 comes in contact with the upper surface and left and right surfaces of the terminal mounting hole 12.

The operation of this embodiment will now be described.

The reinforcing material 30 is applied to the outer peripheral surface of the insulation coating 17, in an area of the wire 14 from a region including the holding area X to the rear end portion of the terminal 15. The region of the wire 14 where the reinforcing material 30 is applied is thereby thickened, and rigidity against bending is improved. Accordingly, when holding the holding area X and inserting the end portion of the wire with terminal 13 including the terminal 15 into the terminal mounting hole 12, buckling of the wire 14 in the region from the holding area X to the terminal 15 will be suppressed.

The effect of this embodiment will now be described.

(1) The wire with terminal 13 includes the reinforcing material 30 adhered to the outer peripheral surface of the insulating coating 17 and the unreinforced part 31 where the reinforcing material 30 is not provided, in the circumferential direction of the wire 14. According to this configuration, buckling of the wire 14 during assembly can be suppressed by the reinforcing material 30. In particular, in recent years, reducing the diameter of the wire 14 has been desired in order to reduce the weight of the vehicle, and thus suppressing buckling of the wire 14 with the reinforcing material 30 is most important to achieving a reduction in the diameter of the wire 14.

Also, in this embodiment, the reinforcing material 30 is partially provided in the circumferential direction of the wire 14. The amount of material that is used for the reinforcing material 30 can thus be suppressed, compared to the case where the reinforcing material 30 is provided around the entire circumference of the wire 14, and, also, the increase in weight of the wire 14 due to providing the reinforcing material 30 and the increase in diameter of the wire 14 where the reinforcing material 30 is provided can be suppressed.

(2) The terminal 15 has the fixing part 22 in which the lengthwise end portion of the wire 14 is fixed by crimping. Also, the reinforcing material 30 is formed by being applied to the outer peripheral surface of the insulation coating 17 from a direction along the crimping direction D2 of the fixing part 22.

According to this configuration, the crimping process of fixing the wire 14 in the fixing part 22 by crimping and the application process of applying the reinforcing material 30 to the outer peripheral surface of the insulation coating 17 can be implemented without changing the installed state of the wire with terminal 13. That is, in the above embodiment, in the case where the crimping pieces 24 and 25 are crimped so that the free ends 24a and 25a face the upper side in the vertical direction in the above crimping process, the material forming the reinforcing material 30 can be applied by being dripped from the above in the vertical direction in the application process. As a result, deterioration in the production efficiency of the wire with terminal 13 due to providing the reinforcing material 30 can be suppressed.

(3) The reinforcing material 30 comes in contact with the inner surface of the terminal mounting hole 12. According to this configuration, buckling of the wire 14 inside the terminal mounting hole 12 can be suppressed.

The embodiment can be implemented by being modified as follows. The embodiment and the following modifications can be implemented in combination with each in so far as no technical incompatibilities arise.

A tubular sealing member that encloses the outer periphery of the insulation coating 17 of the wire 14 may be provided on the rear end side of the terminal 15. Rubber or a similar material capable of sealing between the outer peripheral surface of the insulation coating 17 and the inner surface of the terminal mounting hole 12 can be used for the material forming this sealing member. Also, in the case where this sealing member is provided, the reinforcing material 30 may be provided in an area of the wire 14 from a region including the holding area X to the rear end portion of the sealing member, without interposing the reinforcing material 30 between the sealing member and the insulation coating 17.

The area occupied by the reinforcing material 30 in the circumferential direction of the wire 14 is not limited to the above embodiment, and may be less than 180 degrees or more than 180 degrees.

In the above embodiment, the reinforcing material 30 is formed by being applied to the outer peripheral surface of the insulation coating 17 from a direction along the crimping direction D2 of the fixing part 22, but is not limited thereto, and the reinforcing material 30 may be applied from a direction intersecting the crimping direction D2, such as a direction orthogonal to the crimping direction D2.

In the above embodiment, assuming the free end 24a and 25a sides of the crimping pieces 24 and 25 of the fixing part 22 are on the upper side of the wire with terminal 13, the reinforcing material 30 comes in contact with the upper surface and left and right surfaces of the terminal mounting hole 12, but the reinforcing material 30 need only come in contact with at least one of the four surfaces of the terminal mounting hole 12 having a rectangular cross-section.

In the above embodiment, the reinforcing material 30 comes in contact with the inner surface of the terminal mounting hole 12, but is not limited thereto, and a clearance may be provided between the reinforcing material 30 and the terminal mounting hole 12.

The insulation coating 17 may, in cross-sectional view similar to FIG. 2, have a first outer peripheral surface portion extending in the circumferential direction and a second outer peripheral surface portion extending in the circumferential direction. The reinforcing material 30 may be provided on the first outer peripheral surface portion. The reinforcing material 30 may not be provided on the second outer peripheral surface portion and the insulation coating 17 may be exposed (i.e., unreinforced part 31 may be provided).

The reinforcing material 30 may extend to the first crimping pieces 24 in the lengthwise direction of the wire 14. That is, the reinforcing material 30 may come in contact with the first crimping pieces 24 or be provided with a slight gap therebetween in the lengthwise direction of the wire 14.

The reinforcing material 30, in cross-sectional view similar to FIG. 2, is formed without interruption around the insulation coating 17, and may extend continuously at a given thickness.

The circumferential end portions of the reinforcing material 30 in cross-sectional view similar to FIG. 2 may gradually terminate along the outer peripheral surface of the insulation coating 17.

A configuration may be adopted in which the wire 14 does not come in contact with the lower surface of the terminal mounting hole 12 in cross-sectional view similar to FIG. 2 (i.e., wire 14 may be in suspension away from the lower surface of terminal mounting hole 12). For example, in the above embodiment, the wire 14 comes in contact with the upper surface and left and right surfaces of the terminal mounting hole 12 via the reinforcing material 30. In this case, when inserting the wire 14 into the terminal mounting hole 12, the wire 14 is positioned inside the terminal mounting hole 12 by the places where the wire 14 and the inner surface of the terminal mounting hole 12 come in contact with each other via the reinforcing material 30 (upper surface and left and right surfaces of the terminal mounting hole 12). Incidentally, in the above embodiment, the reinforcing material 30 is not provided on the lower surface of the wire 14 corresponding to the lower surface of the terminal mounting hole 12, and the insulation coating 17 is exposed. The insulation coating 17 coming in contact with the lower surface of the terminal mounting hole 12 can thus be avoided in positioning between the wire 14 and the terminal mounting hole 12. Friction occurring on the insulation coating 17 and the insulation coating 17 being damaged can thereby be prevented.

The thickness of the insulation coating 17 in cross-sectional view similar to FIG. 2 may be sufficiently thin relative the thickness of the core wire 16.

The thickness of the reinforcing material 30 in cross-sectional view similar to FIG. 2 may be sufficiently thin relative to the thickness of the core wire 16.

The length of the area in which the reinforcing material 30 is provided in the lengthwise direction of the wire 14 may be equal to or longer than the length of the terminal 15 in the lengthwise direction of the wire 14. Buckling of the wire 14 when inserting the wire 14 to which the terminal 15 is fixed into the terminal mounting hole 12 can thereby be more effectively prevented.

LIST OF REFERENCE NUMERALS

10 Connector
11 Housing
12 Terminal mounting hole
12a Latching piece
13 Wire with terminal
14 Wire
15 Terminal
16 Core wire
17 Insulation coating
21 Counterpart connection part
22 Fixing part
23 Base part
24 First crimping piece
24a Free end
25 Second crimping piece
25a Free end
30 Reinforcing material
31 Unreinforced part
D1 Insertion direction
D2 Crimping direction
X Holding area

What is claimed is:

1. A wire with terminal including a wire having a core wire made of a conductor and an insulation coating covering an outer periphery of the core wire, and a terminal connected to a lengthwise end portion of the wire, the wire with terminal comprising:
  a reinforcing material adhered to an outer peripheral surface of the insulation coating and an unreinforced part where the reinforcing material is not provided, in a circumferential direction of the wire,
  wherein the terminal has a fixing part in which the lengthwise end portion of the wire is fixed by crimping,
  the reinforcing material is provided, on the outer peripheral surface of the insulation coating, to face a crimping direction of the fixing part, and
  the unreinforced part is provided along an entirety in which the reinforcing material extends in the lengthwise direction of the wire.

2. The wire with terminal according to claim 1,
  wherein the reinforcing material covers only the insulation coating and does not cover the terminal.

3. The wire with terminal according to claim 1,
  wherein the terminal fixes the lengthwise end portion of the wire in the fixing part by crimping with a crimping piece, and
  the reinforcing material extends to the crimping piece of the fixing part in the lengthwise direction of the wire.

4. The wire with terminal according to claim 3,
  the reinforcing material extends to the crimping piece of the fixing part in the lengthwise direction of the wire so as not to overlap the crimping piece along the crimping direction of the fixing part.

5. A connector comprising:
  the wire with terminal according to claim 1; and
  a housing having a terminal mounting hole in which the end portion of the wire with terminal including the terminal is inserted.

6. The connector according to claim 5,
  wherein the reinforcing material comes in contact with an inner surface of the terminal mounting hole.

* * * * *